(12) United States Patent
Do et al.

(10) Patent No.: US 10,755,539 B2
(45) Date of Patent: *Aug. 25, 2020

(54) TACTILE INFORMATION PROVIDING DEVICE

(71) Applicant: CK MATERIALS LAB CO., LTD., Seoul (KR)

(72) Inventors: Seoung Hun Do, Daegu (KR); Hyeong Jun Kim, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,235

(22) Filed: May 14, 2019

(65) Prior Publication Data

US 2019/0266858 A1    Aug. 29, 2019

Related U.S. Application Data

(62) Division of application No. 15/959,437, filed on Apr. 23, 2018, now Pat. No. 10,332,366, which is a division of application No. 15/313,358, filed as application No. PCT/KR2014/008931 on Sep. 25, 2014, now Pat. No. 9,965,929.

(30) Foreign Application Priority Data

Jul. 18, 2014  (KR) .......................... 10-2014-0090910
Sep. 12, 2014  (KR) .......................... 10-2014-0121348

(51) Int. Cl.
*H04B 3/36* (2006.01)
*G08B 6/00* (2006.01)
*G06F 3/01* (2006.01)
*B06B 1/04* (2006.01)

(52) U.S. Cl.
CPC ................ *G08B 6/00* (2013.01); *B06B 1/045* (2013.01); *G06F 3/016* (2013.01)

(58) Field of Classification Search
CPC .................................. G08B 6/00; G08F 3/016
USPC .......... 340/407.1, 407.3, 517, 521, 540, 541
See application file for complete search history.

(56) References Cited

U.S. PATENT DOCUMENTS

| 7,086,507 B2 | 8/2006 | Hitchcock |
| 7,102,474 B2 * | 9/2006 | Lerner ................... F16F 1/361 188/380 |
| 7,829,162 B2 * | 11/2010 | Eskra ..................... B41M 5/385 400/241 |
| 8,607,657 B2 | 12/2013 | Haevescher |

(Continued)

FOREIGN PATENT DOCUMENTS

| EP | 1835380 A1 | 9/2007 |
| KR | 1020100073616 A1 | 7/2010 |

(Continued)

*Primary Examiner* — Tai T Nguyen
(74) *Attorney, Agent, or Firm* — Stuart H. Mayer; Mayer & Williams PC

(57) ABSTRACT

The present invention relates to a tactile information providing device. The tactile information providing device according to the present invention comprises a tactile transmission unit (1: 10, 20) formed of a magneto-rheological elastomer (MRE) material, wherein the tactile transmission unit (1) provides tactile information through the transformation (10*a*-10*d*, 20*a*-20*d*) by an external magnetic field.

14 Claims, 10 Drawing Sheets

(56) References Cited

U.S. PATENT DOCUMENTS

| | | | |
|---|---|---|---|
| 2004/0040805 A1* | 3/2004 | Bailey | G01B 5/008 188/267.2 |
| 2005/0040922 A1 | 2/2005 | Lerner | |
| 2010/0079410 A1 | 4/2010 | Milton | |
| 2012/0015149 A1 | 1/2012 | Keefe | |
| 2012/0112894 A1 | 5/2012 | Yang | |
| 2012/0271150 A1 | 10/2012 | Ehman | |
| 2013/0147095 A1 | 6/2013 | Kim | |

FOREIGN PATENT DOCUMENTS

| | | |
|---|---|---|
| KR | 1020130030913 | 3/2013 |
| KR | 1020130042199 | 4/2013 |
| KR | 1020090121548 | 11/2013 |
| KR | 101342436 | 12/2013 |

\* cited by examiner

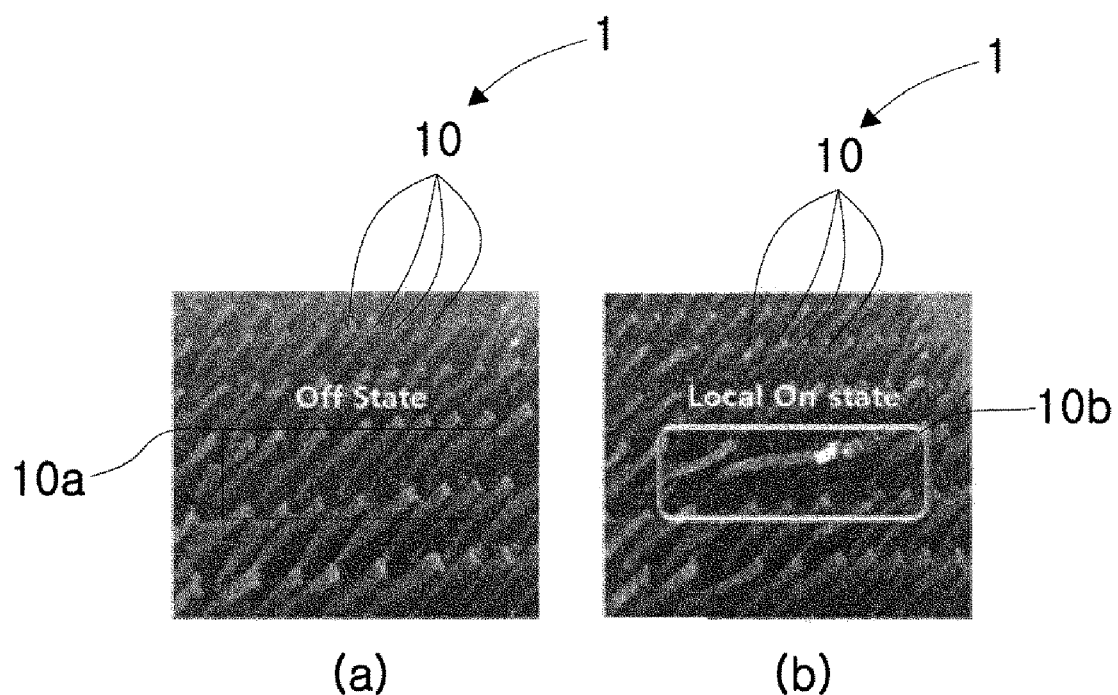

[FIG. 2]
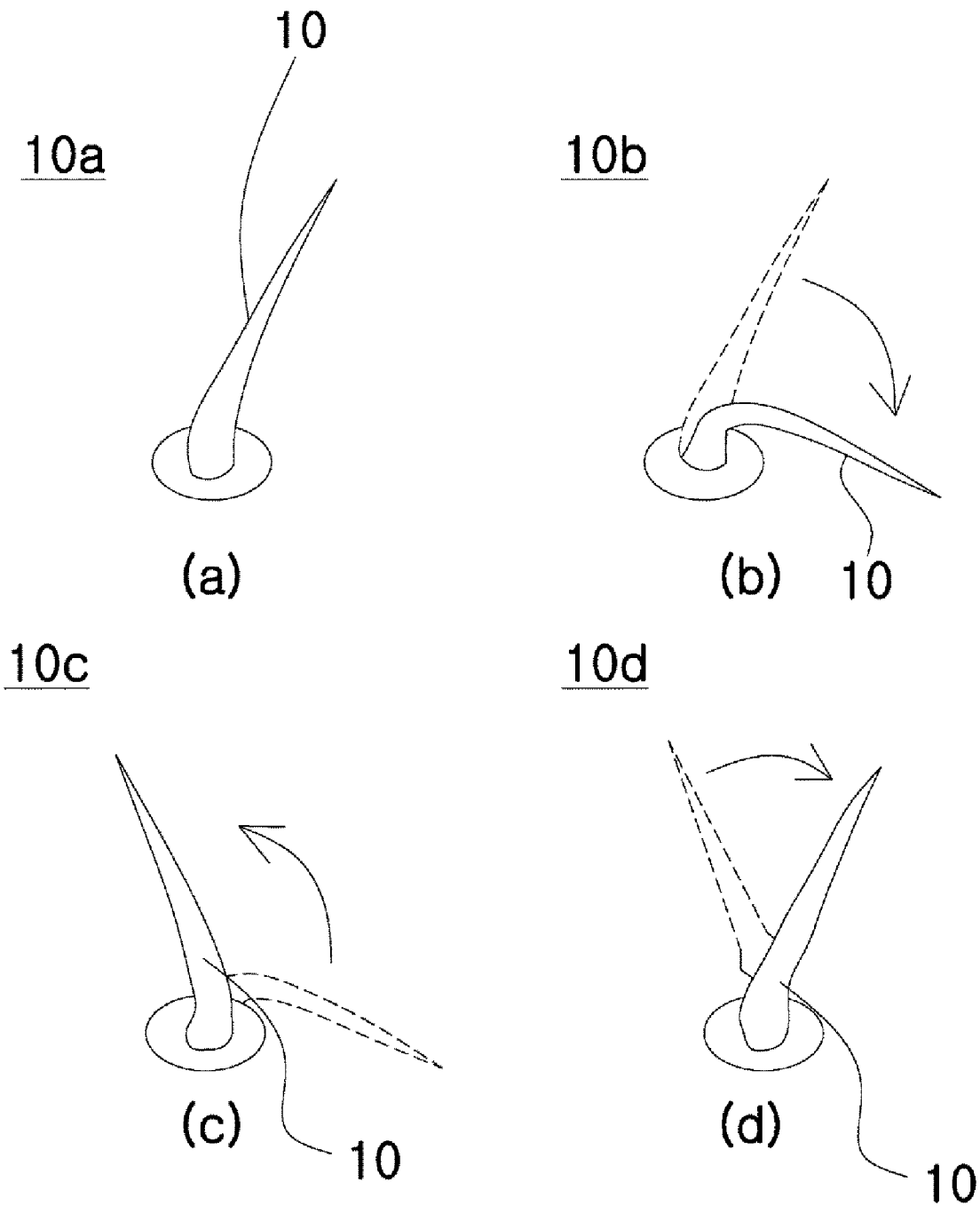

[FIG. 3]
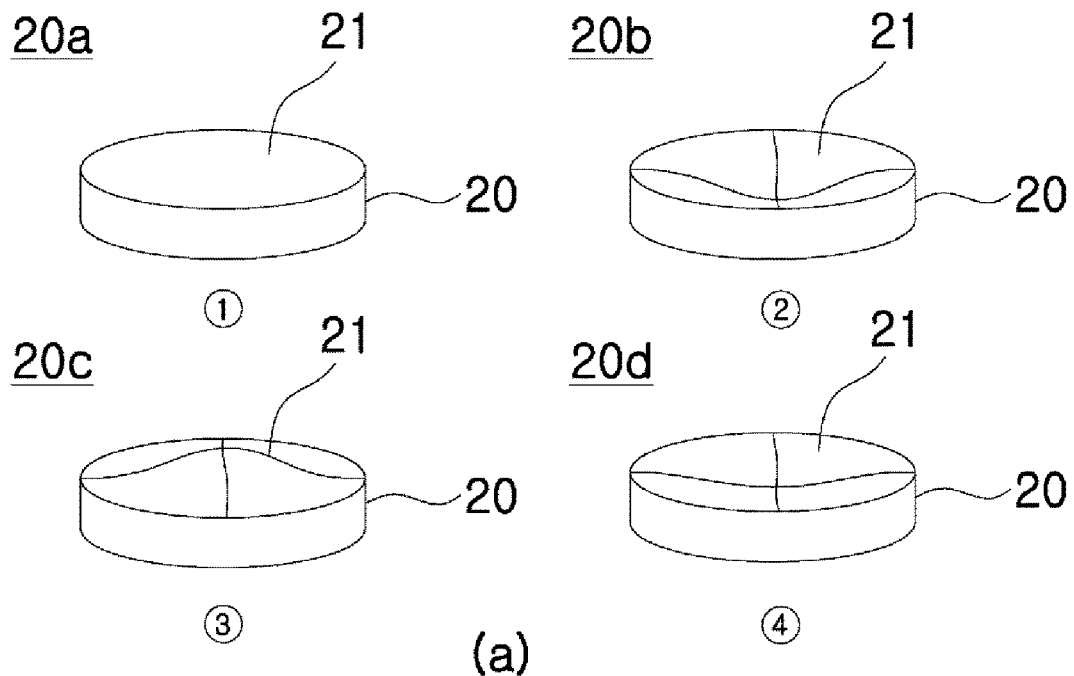
(a)
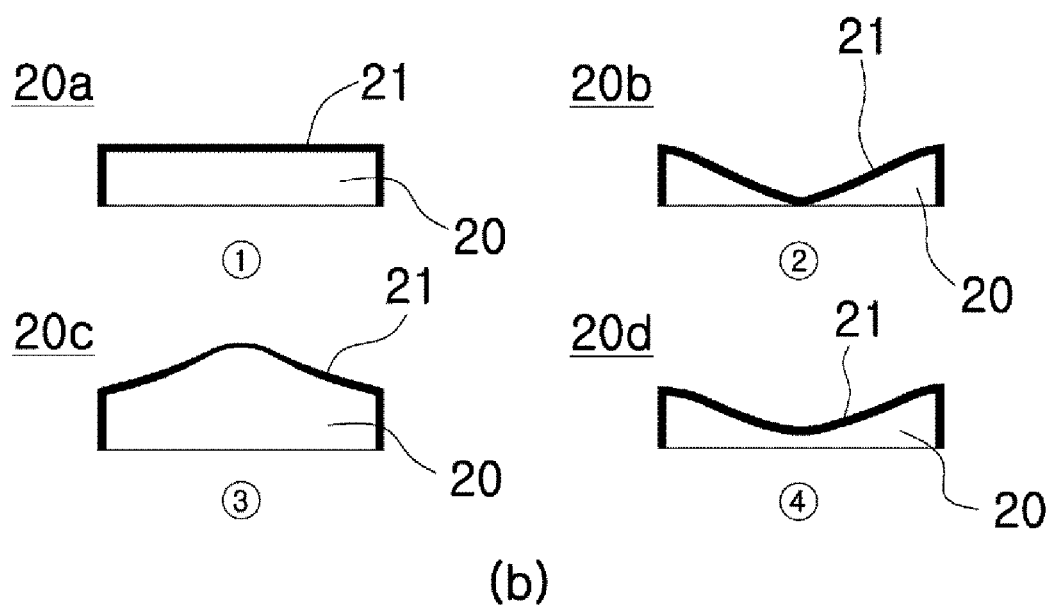
(b)

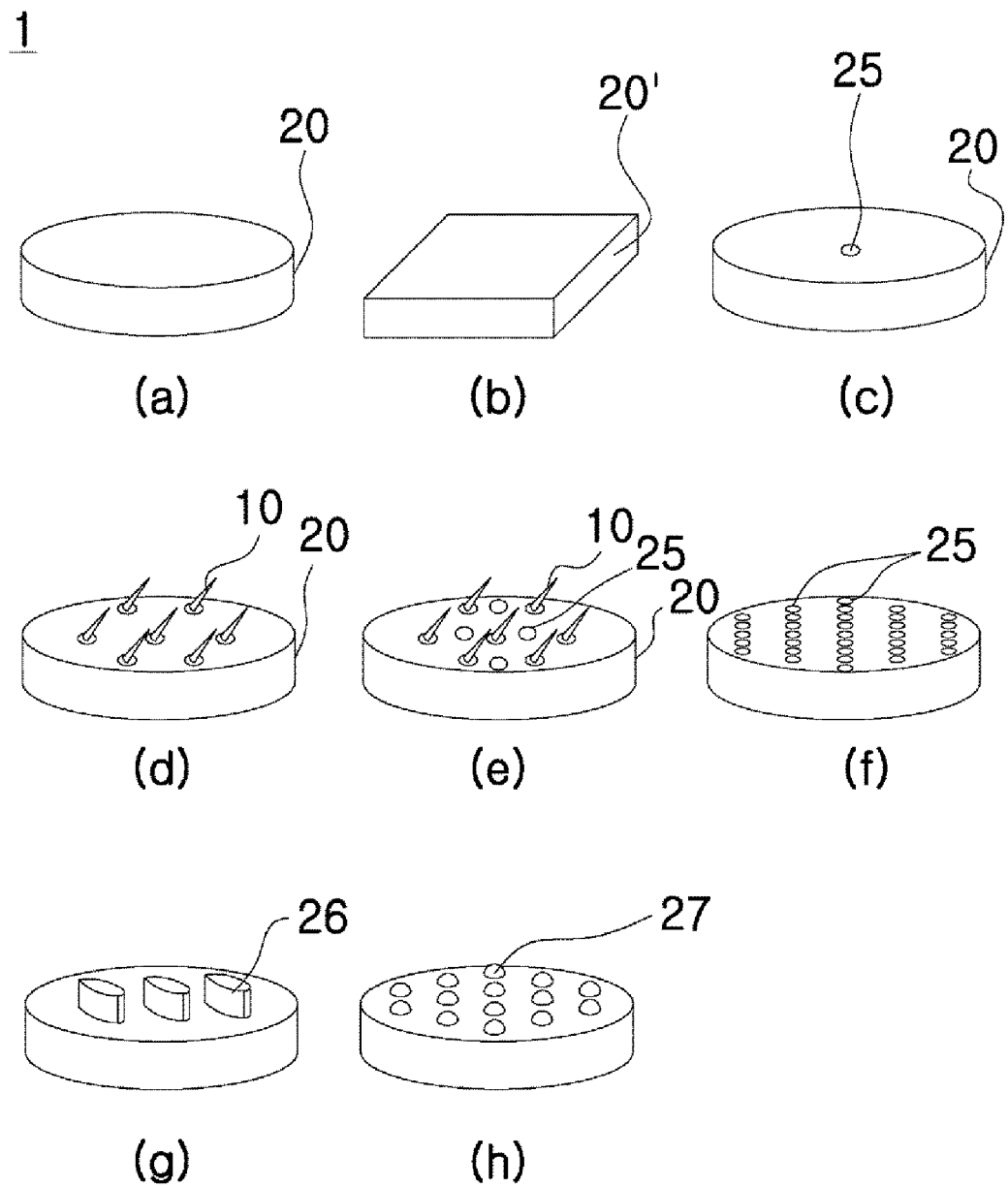
[FIG. 4]

[FIG. 5]
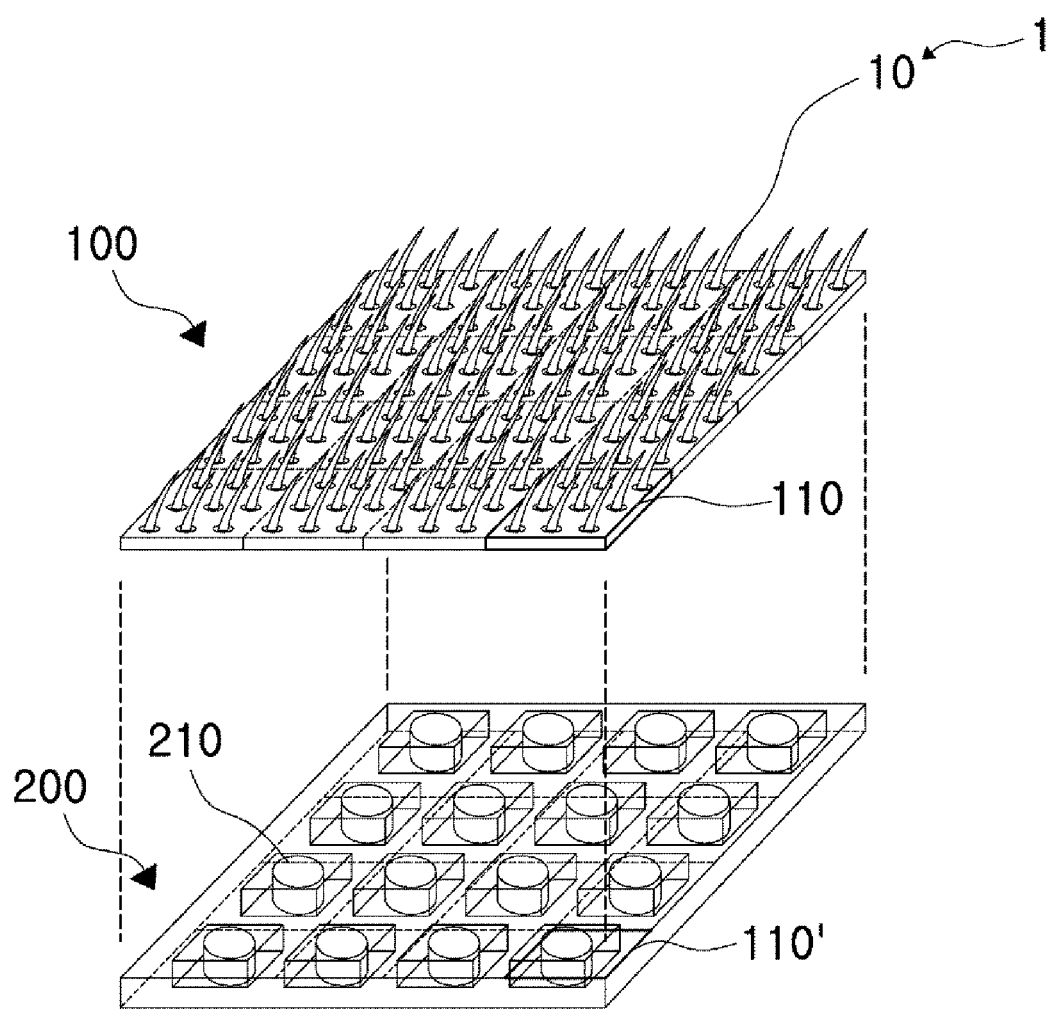

[FIG. 6]
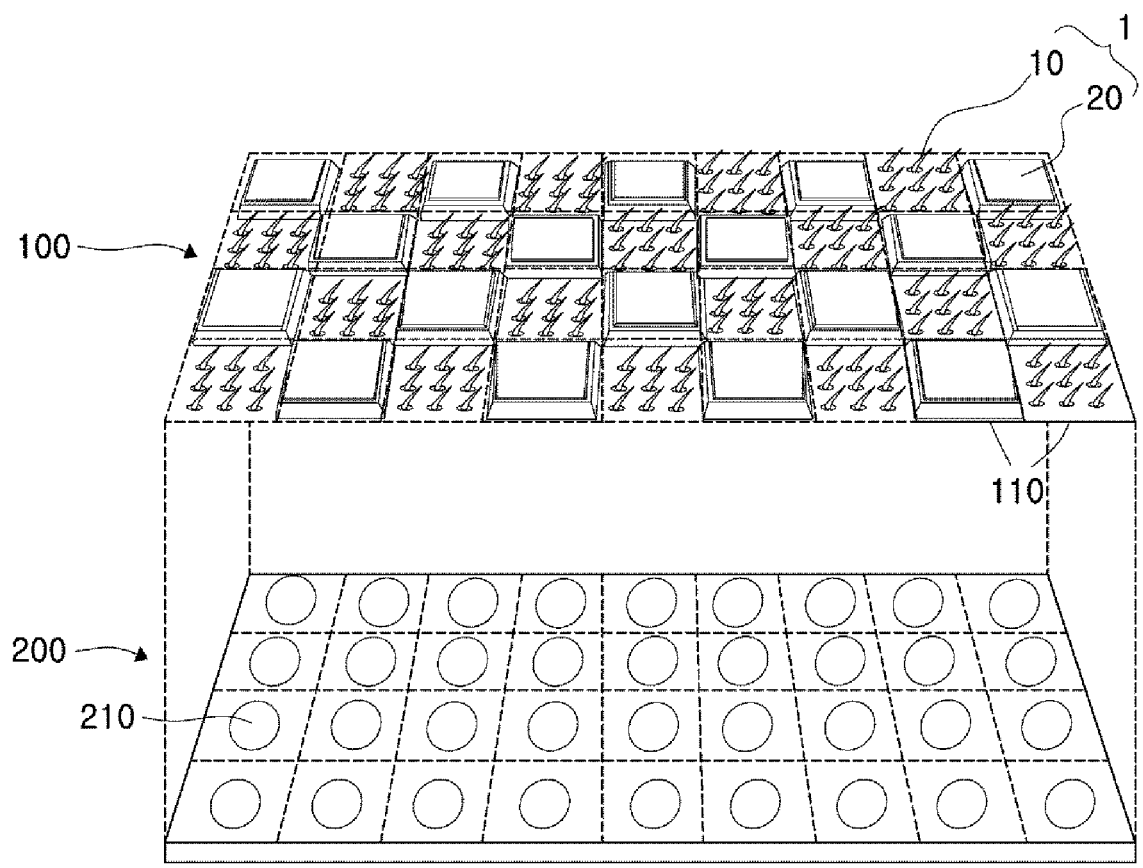

[FIG. 7]
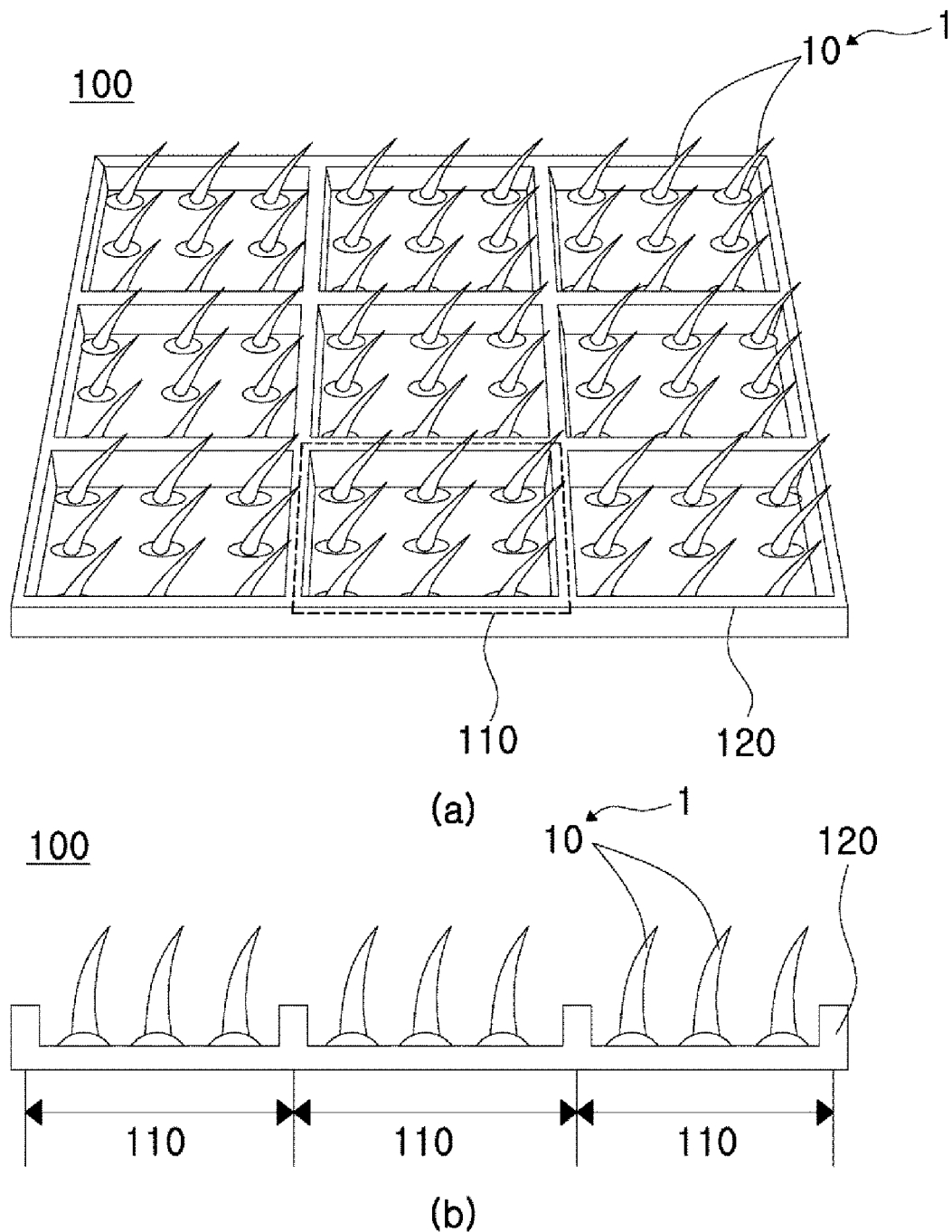

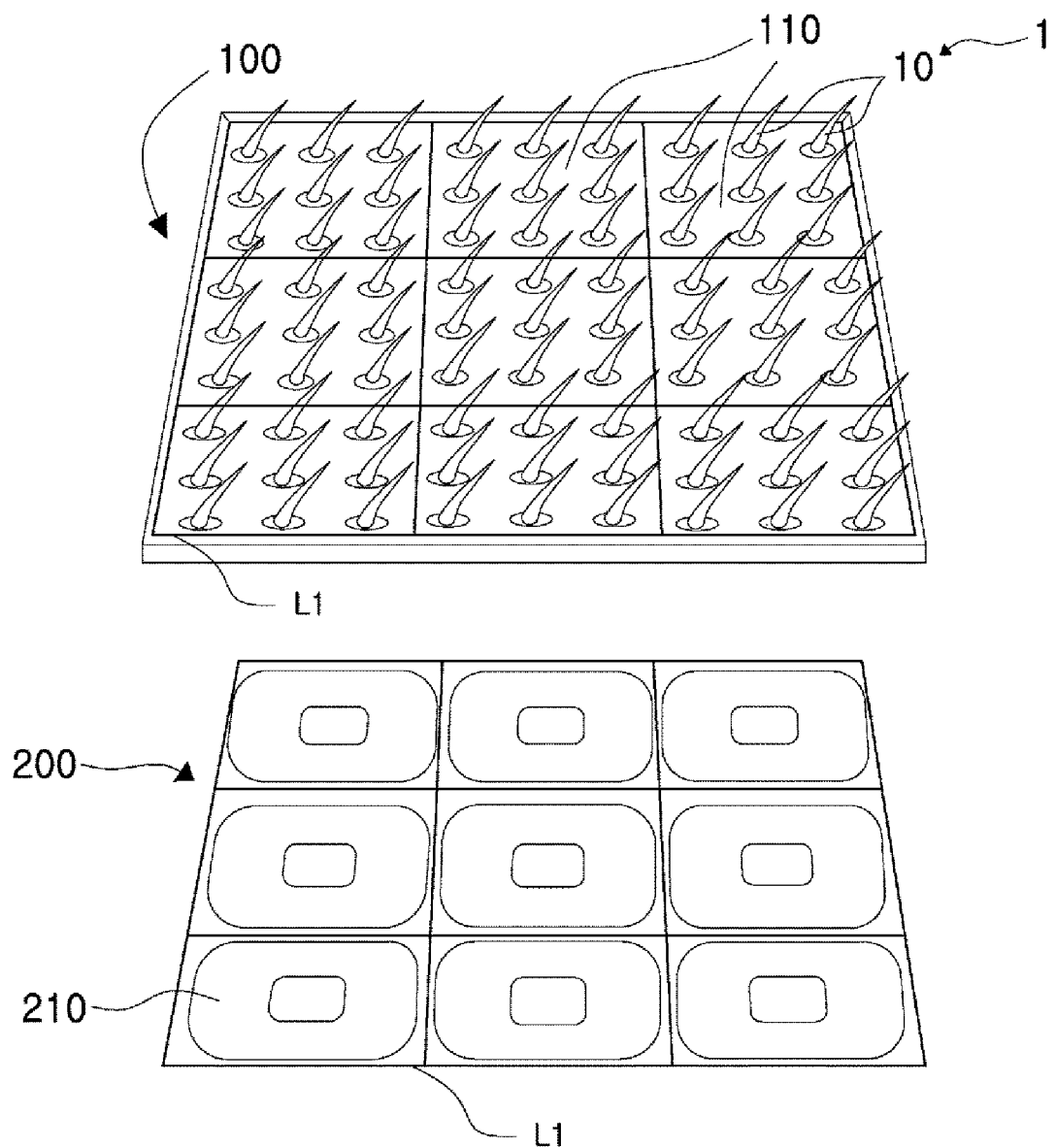
[FIG. 8]

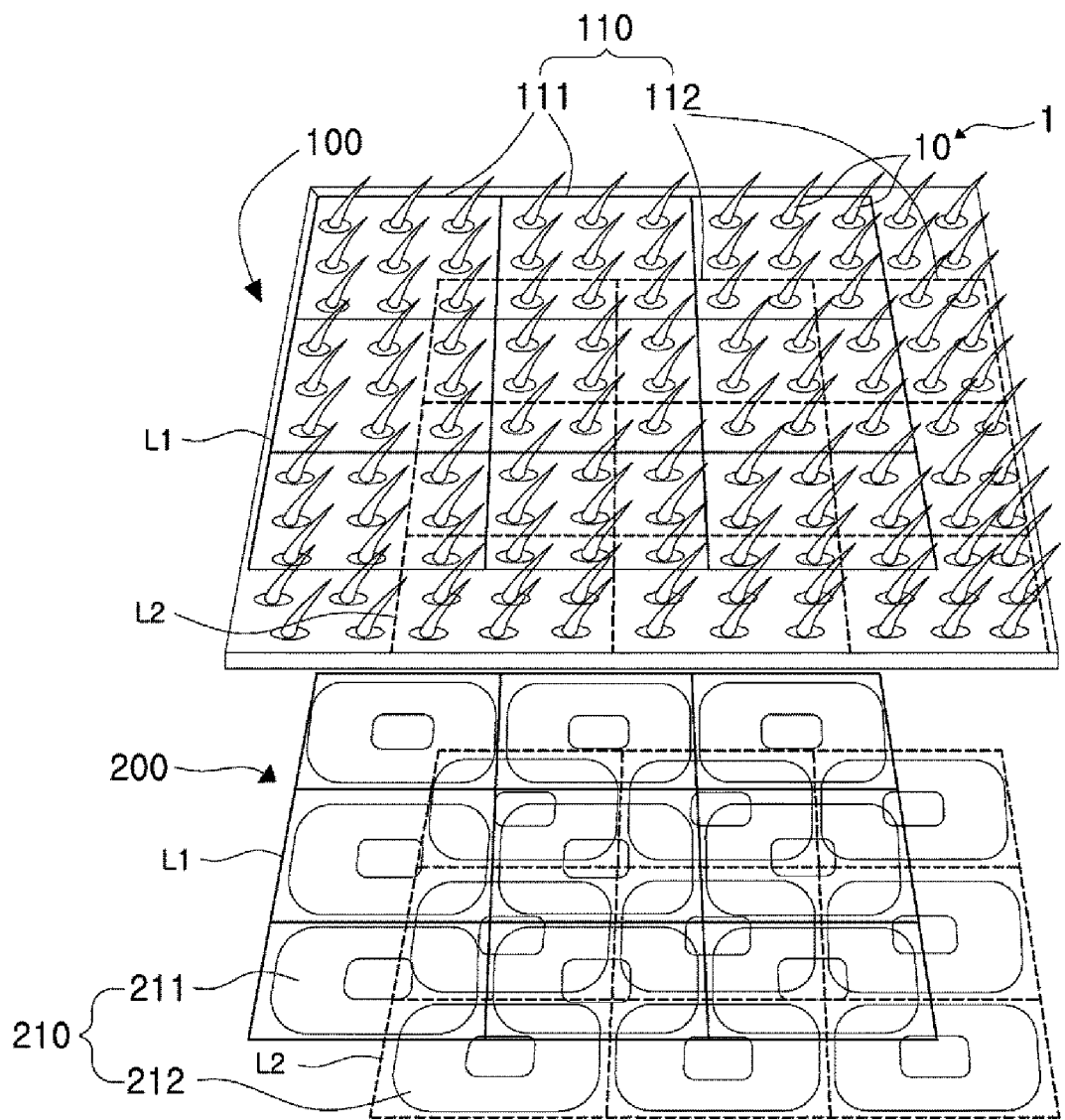
[FIG. 9]

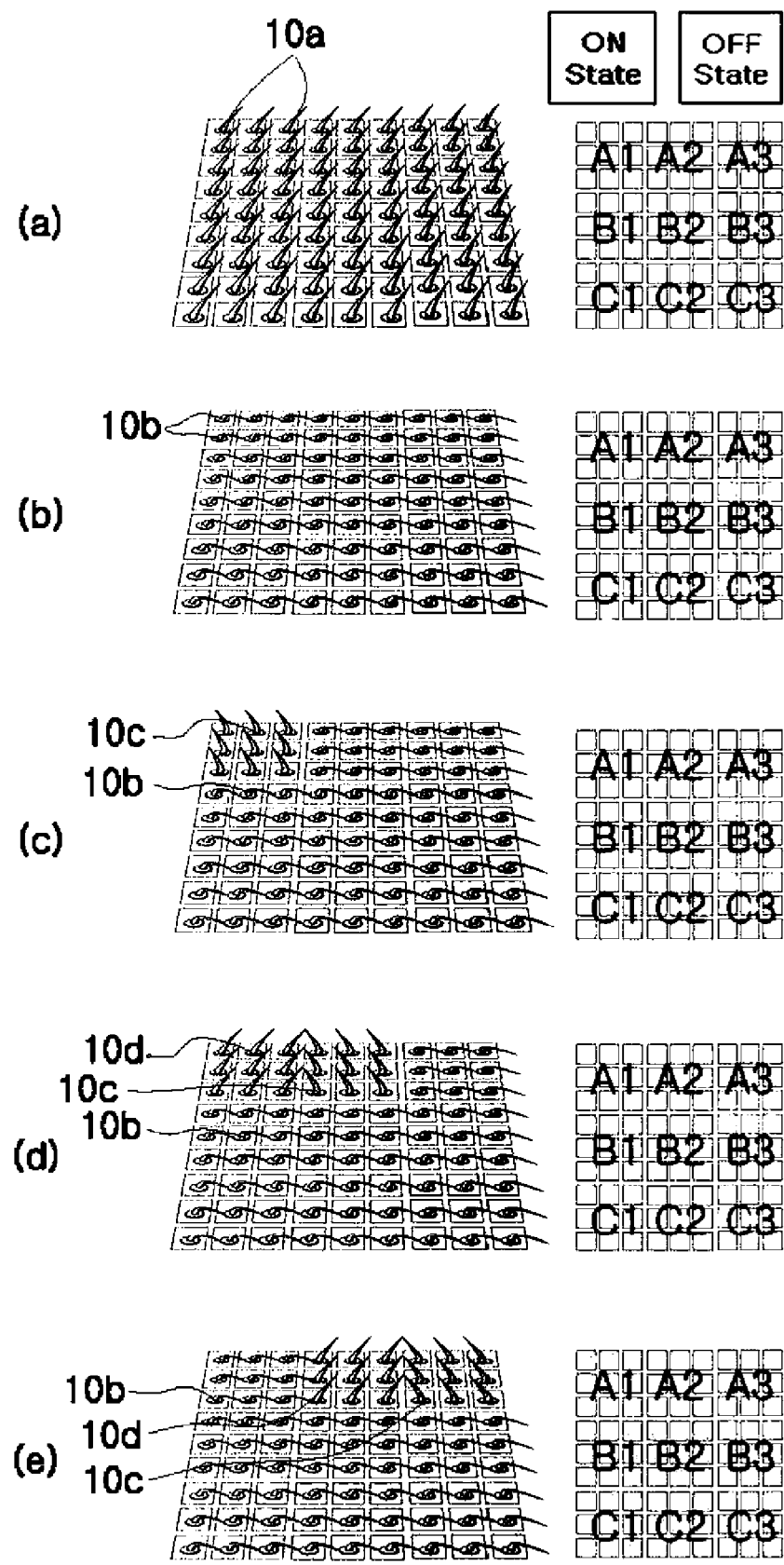
[FIG. 10]

TACTILE INFORMATION PROVIDING DEVICE

CROSS REFERENCE TO RELATED APPLICATIONS

This application is a divisional of U.S. Pat. No. 10,332,366, issued Jun. 25, 2019, which is a divisional of U.S. Pat. No. 9,965,929, issued May 8, 2018, the contents of which are incorporated herein by reference.

TECHNICAL FIELD

The present invention relates to a tactile information supply device and, more particularly, to a tactile information supply device for providing various types of tactile information to a user by using variation in shape of a magnetorheological elastomer or an electrorheological elastomer, in response to an externally applied magnetic field or electric field.

BACKGROUND ART

Haptics refer to a technology about tactile sensation and, more particularly, to a technology for allowing a user of an electronic device to feel touch, forces, motion, etc. through a keyboard, a mouse, a joystick, a touchscreen, or the like. Although visual information accounted for most of the information exchanges between electronic devices and people in the past, the haptic technology currently attracts attention with regard to providing more detailed and realistic information.

In general, an inertial actuator, a piezoelectric actuator, an electroactive polymer (EAP) actuator, an electrostatic actuator, etc. are used for the haptic technology. Examples of the inertial actuator include an eccentric motor that vibrates by an eccentric force generated by the rotation of the motor, and a linear resonant actuator (LRA) that maximizes the vibrational intensity by resonant frequencies. The piezoelectric actuator is in the shape of a beam or a disk and is driven by a piezoelectric element whose size or shape changes instantaneously in response to an electric field. The EAP actuator generates vibration by repeated movements of a mass attached to an EAP film. The electrostatic actuator is driven by an attractive force generated between two oppositely charged glass sheets and a repulsive force generated when the glass sheets have charges with the same polarity.

However, the above-described conventional haptic technology is merely used to provide simple vibration, and therefore has limitations for providing emotional information or complicated text information. Accordingly, research needs to be conducted on a tactile information supply structure capable of effectively providing emotion and complicated information as well as simply providing vibration.

DETAILED DESCRIPTION OF THE INVENTION

Technical Problem

The present invention provides a tactile information supply device capable of emotionally providing various types of tactile information.

The present invention also provides a tactile information supply device capable of effectively providing not only a simple signal such as an alarm but also complicated information such as texts or geometric figures as tactile information by configuring a tactile unit in the form of at least one cell.

Technical Solution

According to an aspect of the present invention, there is provided a tactile information supply device that includes a tactile sensation provider comprising a magnetorheological elastomer (MRE), wherein the tactile sensation provider provides tactile information by being transformed in response to an external magnetic field.

Furthermore, there is provided a tactile information supply device that includes a tactile sensation provider comprising an electrorheological elastomer (ERE), wherein the tactile sensation provider provides tactile information by being transformed in response to an external electric field.

Advantageous Effects

According to the present invention, various types of tactile information may be provided emotionally.

Furthermore, by configuring a tactile unit in the form of at least one cell, not only a simple signal such as an alarm but also complicated information such as texts or geometric figures may be effectively provided as tactile information.

DESCRIPTION OF THE DRAWINGS

FIG. 1 illustrates the change of the shape of a tactile sensation provider in response to an external magnetic/electric field, according to an embodiment of the present invention.

FIG. 2 illustrates the process of providing a tactile information by a tactile sensation provider in response to an external magnetic/electric field, according to an embodiment of the present invention.

FIG. 3 illustrates the process of providing a tactile information by a tactile sensation provider in response to an external magnetic/electric field, according to another embodiment of the present invention.

FIG. 4 illustrates various shapes of the tactile sensation provider, according to various embodiments of the present invention.

FIG. 5 is a perspective view of the tactile information supply device, according to an embodiment of the present invention.

FIG. 6 is a perspective view of a tactile unit including a plurality of cells, according to an embodiment of the present invention.

FIG. 7 illustrates a tactile unit having cell barriers, according to an embodiment of the present invention.

FIG. 8 is a view showing the alignment of coil units, according to an embodiment of the present invention.

FIG. 9 is a view showing the alignment of coil units, according to another embodiment of the present invention.

FIG. 10 illustrates the operation process of a tactile information supply device, according to an embodiment of the present invention.

EXPLANATION OF REFERENCE NUMERALS 1, 10, 20: Tactile sensation providers
50: Tactile information supply device
100: Tactile unit
110, 111, 112: Cells
120: Cell barriers

200: Magnetic field generator
210, 211, 212: Coil units
L1, L2: Virtual cell ranges

MODE OF THE INVENTION

The accompanying drawings, which show embodiments for illustrative purposes only, will be referred to. The embodiments will be described in sufficient detail for one of ordinary skill in the art to understand the present invention. It should be understood that various embodiments of the present invention may differ from each other but need not be mutually exclusive. For example, particular shapes, structures and characteristics disclosed herein may be embodied in other embodiments without departing from the spirit and scope of the present invention. Furthermore, the position or arrangement of individual elements in each embodiment disclosed herein may change without departing from the spirit and scope of the present invention. Accordingly, the following detailed description is not intended to be restrictive, and the scope of the present invention is determined only by the accompanying claims along with equivalents of what is claimed by the claims, if properly explained. In the drawings, like reference numerals denote like elements and lengths, areas, thicknesses or shapes may be exaggerated for the sake of convenience.

The following description is given of embodiments of the present invention with reference to the attached drawings in such a manner that the present invention can be easily carried out by one of ordinary skill in the art.

A magnetorheological elastomer (MRE) or an electrorheological elastomer (ERE) is an elastomer material including particles that are capable of responding to an external magnetic or electric field. Particularly, since the magnetorheological elastomer material includes magnetic particles such as iron (Fe) that are capable of being magnetized in response to an external magnetic field, the characteristics of the MRE, e.g., stiffness, tensile strength, and elongation rate, may be changed by the application of the external magnetic field.

Furthermore, the ERE includes polarizable particles in an elastomer and its characteristics such as stiffness may change in response to an externally applied electric field, which is similar to MREs. It will be appreciated that although the following description will be given with regard to the MRE, the same principle will be applied to the ERE.

FIG. 1 illustrates the change of the shape of a tactile sensation provider 1 in response to an external magnetic/electric field, according to an embodiment of the present invention.

Referring to FIG. 1, the tactile sensation provider 1: 10 and 20 may include a magnetorheological elastomer or an electrorheological elastomer so as to provide tactile information. Furthermore, the tactile sensation provider 1: 10 and 20 may be transformed to form different shapes depending on the influence of an external magnetic/electric field.

Referring to (a) of FIG. 1, when a plurality of tactile sensation providers 1 is not influenced by an external magnetic/electric field (Off State), in other words, when a magnetic/electric field is not generated by a coil unit 210 (see FIG. 5), which is described below, of the magnetic field generator 200 or by an electrode unit (not shown) of an electric field generator (not shown), the plurality of tactile sensation providers 1 may have a first shape 10a and 20a (see FIGS. 2 and 3).

Referring to (b) of FIG. 1, when part of the plurality of tactile sensation providers 1 is influenced by an external magnetic/electric field (Local On State), in other words, when a magnetic/electric field is generated by the coil unit 210 (see FIG. 5), which is described below, of the magnetic field generator 200 or by an electrode unit (not shown) of an electric field generator (not shown), the part of the plurality of tactile sensation providers 1 may have a second shape 10b and 20b (see FIGS. 2 and 3).

FIG. 2 illustrates the process of providing tactile information by a tactile sensation provider in response to an external magnetic/electric field, according to an embodiment of the present invention. FIG. 3 illustrates the process of providing tactile information by a tactile sensation provider 1 in response to an external magnetic/electric field, according to another embodiment of the present invention. FIG. 4 illustrates various shapes of the tactile sensation provider, according to various embodiments of the present invention.

Referring to FIG. 2, the tactile sensation provider 1 may be in the shape of a fine projection 10. The thickness of the fine projection 10 may be equal to or smaller than about 25 μm, similar to the fleece of a sheep, or may be equal to or smaller than about 100 μm, similar to human hair, to provide tactile information precisely and emotionally.

As shown in (a) of FIG. 2, when not influenced by an external magnetic/electric field, the fine projection 10 may remain slightly inclined (or the first shape 10a). Alternatively, the fine projection 10 may remain straight and vertical without inclination. Then, as shown in (b) of FIG. 2, when influenced by an external magnetic/electric field, the fine projection 10 may remain further inclined or even horizontal (or the second shape 10b). Then, as shown in (c) and (d) of FIG. 2, when not affected by the external magnetic/electric field after the application of the magnetic/electric field is ceased, the fine projection 10 may return from the second shape 10b to the first shape 10a and produce a reciprocating motion 10c and 10d by its own elastic force (or restoring force). Accordingly, tactile information similar to brushing or tickling may be transferred by the fine projection 10 moving in the reciprocating motion 10c and 10d.

Referring to FIG. 3, the tactile sensation provider 1 may be in the shape of an empty cylinder 20, dome or polyhedron 20' (see (b) of FIG. 4). (a) of FIG. 3 is a perspective view of the tactile sensation provider 1 in the shape of the cylinder 20, and (b) of FIG. 3 is a vertical cross-sectional view of the tactile sensation provider 1 in the shape of the cylinder 20.

When not influenced by an external magnetic/electric field, the empty cylinder 20 may have a top surface 21, which is flat (or a first shape 20a) as indicated by ①. Then, when influenced by an external magnetic/electric field, the top surface 21 of the cylinder 20 may subside into the empty internal space (or a second shape 20b) as indicated by ②. Then, when not affected by the external magnetic/electric field after the application of the magnetic/electric field is ceased, the cylinder 20 may return from the second shape 20b to the first shape 20a and produce a reciprocating motion 20c and 20d by its own elastic force (or restoring force), as indicated by ③ and ④. Accordingly, tactile information similar to tapping may be transferred by the cylinder moving in the reciprocating motion 20c and 20d.

At least one of the degree (amount), direction, and frequency of the transformation from the first shape 10a or 20a to the second shape 10b or 20b of the tactile sensation provider 1 can be controlled by controlling at least one of the intensity, direction and frequency of a magnetic field generated by the magnetic field generator 200 (see FIG. 6) or an electric field generated by the electric field generator (not shown). For example, if a stronger magnetic/electric field is applied, the fine projections 10 will be inclined more or the top surface 21 of the cylinder 20 will subside more, thereby transferring stronger tactile information. Furthermore, if the frequency of the magnetic/electric field is changed, the speed of transformation of the fine projections 10 or the cylinder 20 from the first shape 10a or 20a to the second shape 10b or 20b and then back to the first shape 10a or 20a also changes, thereby transferring various types of tactile information.

Referring to FIG. 4, the tactile sensation provider 1 may have various shapes besides the shape of the fine projection 10, the empty cylinder 20, dome, or polyhedron 20'.

(1) (a) of FIG. 4 shows the empty cylinder 20, (2) (b) of FIG. 4 shows an empty hexahedron 20' (or polyhedron 20'), (3) (c) of FIG. 4 shows the empty cylinder 20 with a top surface wherein micro-holes 25 are provided, capable of increasing the durability of the tactile sensation provider 1 by allowing air to smoothly enter and exit through the micro-holes 25 while the top surface moves in the reciprocating motion 20c and 20d, (4) (d) of FIG. 4 shows a combined shape of the fine projections 10 and the empty cylinder 20, (5) (e) of FIG. 4 shows a shape identical to the shape of (d) of FIG. 4, except that a plurality of micro-holes 25 are provided in the top surface of the cylinder 20, (6) (f) of FIG. 4 shows a shape identical to the shape of (c) of FIG. 7, except that a plurality of micro-holes 25 are provided, (7) (g) of FIG. 4 shows the empty cylinder 20 with a top surface wherein various structures 26 (e.g., empty cylinders smaller than the cylinder 20) are combined, and (8) (h) of FIG. 4 shows the empty cylinder 20 with a top surface wherein dome-shaped embossed structures 27 are provided.

As described above, according to the present invention, various types of tactile information such as brushing, tickling, tapping, etc. may be transferred in multiple ways by configuring the tactile sensation provider 1 in various shapes.

FIG. 5 is a perspective view of the whole tactile information supply device 50, according to an embodiment of the present invention, and FIG. 6 is a perspective view of a tactile unit 100 including a plurality of cells 110, according to an embodiment of the present invention.

Referring to FIG. 5, the tactile information supply device 50 according to an embodiment of the present invention includes the tactile unit 100 and the magnetic field generator 200 (when the tactile sensation provider 1 comprises an MRE)/electric field generator (not shown) (when the tactile sensation provider 1 comprises an ERE) and the tactile unit 100 includes at least one tactile sensation provider 1.

The tactile unit 100 is a part that actually contacts a user of the tactile information supply device 50 and transfer tactile information. The tactile unit 100 may include at least one cell 110. The size of the cell 110 may be appropriately determined in consideration of the size of the tactile unit 100, and the resolution of tactile sensation to be transferred.

The cell 110 may include at least one tactile sensation provider 1. The cell 110 may include one or more types of the tactile sensation provider 1. In the tactile information supply device 50' shown in FIG. 6, each cell 110 may include various types of the tactile sensation providers 1, e.g., the fine projections 10 and the empty cylinders 20.

The magnetic field generator 200 may generate a magnetic field and include at least one coil unit 210. It is preferable that the magnetic field generator 200 is provided under the tactile unit 100 and each coil unit 210 (or each cell 110' including the coil unit 210) corresponds to each cell 110 of the tactile unit 100. However, the magnetic field generator 200 may be provided at locations other than under the tactile unit 100 as long as it is within a range in which each coil unit 210 can apply a magnetic field to its corresponding cell 110.

The electric field generator (not shown) may generate an electric field and include at least one electrode unit (not shown). It is preferable that the magnetic field generator (not shown) is provided under the tactile unit 100 and each electrode unit (not shown) corresponds to each cell 110 of the tactile unit 100. Meanwhile, a lower electrode (not shown) may be positioned under the tactile unit 100, and an upper electrode (not shown), a film having an electrode pattern, etc. may be formed above or on the surface of the tactile unit 100. Besides, the electric field generator (not shown) may be provided at various locations as long as it is within a range in which each electrode unit (not shown) can apply an electric field to its corresponding cell 110.

FIG. 7 illustrates the tactile unit 100 having cell barriers 120, according to an embodiment of the present invention.

Referring to FIG. 7, the cell barriers 120 may be provided on the tactile unit 100. The cell barriers 120 may be provided along the perimeters of the cells 110 and serve to protect the tactile sensation providers 1: 10 and 20. It is preferable that the cell barriers 120 have a height lower than that of the tactile sensation providers 1 such that the tactile sensation providers 1 are protected and efficiently transfer tactile information at the same time.

For example, assuming that the tactile unit 100 is configured as the cells 110 having the fine projections 10, a user of the tactile information supply device 50 may press the fine projections 10 too hard while the user receives tactile information. In this case, it is problematic that the fine projections 10 may be left flat and therefore broken or the durability of the fine projections 10 may be deteriorated. Accordingly, if the cell barriers 120 have a height lower than the height of the fine projections 10, even when the user presses the fine projections 10 hard, the fine projections 10 may be prevented from being left flat and therefore protected. In addition, since the fine projections 10 may move as high as at least the height of the cell barriers 120, tactile information may be sufficiently transferred to the user's skin.

Meanwhile, as shown in FIG. 6, when the cells 110 include the fine projections 10 and the empty hexahedrons 20 or when one cell 110 includes a combination of the fine projections 10 and the empty hexahedron 20, the empty hexahedrons 20 may have a height lower than that of the fine projections 10 and therefore serve in a similar manner as the cell barriers 120 do, without the cell barriers 120.

FIG. 8 is a view showing the alignment of the coil units 210, according to an embodiment of the present invention, and FIG. 9 is a view showing the alignment of the coil units 210: 211 and 212 according to another embodiment of the present invention.

Referring to FIG. 8, the tactile information supply device 50 according to an embodiment of the present invention may include the tactile unit 100 having a plurality of cells 110 in a 3×3 matrix, and the magnetic field generator 200 having a plurality of coil units 210 in a 3×3 matrix. The cells 110 and the coil units 210 in a range L1 may correspond to each other, and therefore the number of the cells 110 and the number of coil units 210 are the same. The coil units 210 may be provided as a single layer (e.g., FIG. 8) or multiple layers (e.g., FIG. 9) in the magnetic field generator 200. Each cell 110 of the tactile unit 100 may include a plurality of fine projections 10 in a 3×3 matrix.

In the tactile information supply device 50 of FIG. 8, when a magnetic field is generated by one coil unit 210, at least one fine projections 10 provided on a cell 110 that corresponds to the coil unit 210 may be transformed from the first shape 10a to the second shape 10b. When the magnetic field generated by the coil unit 210 is dissipated, the fine projections 10 on the cell 110 corresponding to the coil unit 210 return from the second shape 10b to the first shape 10a.

Referring to FIG. 9, the tactile information supply device 50 according to another embodiment of the present invention may include the coil units 210 provided as multiple layers 211 and 212 in the magnetic field generator 200. The cells 111 in a 3×3 matrix and the coil units in a 3×3 matrix within a virtual range L1 indicated by a solid line may correspond to each other, and the cells 112 in a 3×3 matrix and the coil units 212 in a 3×3 matrix within a virtual range L2 indicated by a dashed line may correspond to each other. The fine projections 10 in a 3×3 matrix may be provided on each cell 110 of the tactile unit 100.

In the tactile information supply device 50 of FIG. 9, the coil units 211 may transform the shape of the fine projections 10 on the cells 111 within the virtual range L1 indicated by the solid line, and the coil units 212 may transform the shape of the fine projections 10 on the cells 112 within the virtual range L2 indicated by the dashed line. Therefore, the fine projections 10 in both the ranges L1 and L2 may be transformed by a plurality of coil units 211 and 212 and therefore further fine-tuned. As such, compared with the tactile information supply device 50 of FIG. 8, a higher resolution may be achieved and more detailed tactile information may be provided easily.

FIG. 10 illustrates the operation process of a tactile information supply device 50, according to an embodiment of the present invention.

Referring to (a) of FIG. 10, magnetic fields are not yet applied to cells A1 to C3 on the tactile unit 100. Accordingly, all the fine projections 10 on the tactile unit 100 may maintain the first shape 10a.

Referring to (b) of FIG. 10, magnetic fields are applied to cells A1 to C3 on the tactile unit 100 and therefore all the fine projections 10 on the tactile unit 100 may maintain the second shape 10b.

Referring to (c) of FIG. 10, when only the magnetic field applied by the coil unit 210 positioned corresponding to cell A1 is ceased, only the fine projections 10 on cell A1 may return to the first shape 10a and produce the reciprocating motion 10c and 10d by their own elastic force (or restoring force).

Referring to (d) of FIG. 10, when only the magnetic field applied by the coil unit 210 positioned corresponding to cell A2 is ceased, only the fine projections 10 on cell A2 may return to the first shape 10a and produce the reciprocating motion 10c and 10d by their own elastic force (or restoring force). The reciprocating motion of the fine projections 10 on cell A1 may be weakened compared to that of the fine projections 10 on cell A2.

Referring to (e) of FIG. 10, when only the magnetic field applied by the coil unit 210 positioned corresponding to cell A3 is ceased, only the fine projections 10 on cell A3 may return to the first shape 10a and produce the reciprocating motion 10c and 10d by their own elastic force (or restoring force). The reciprocating motion of the fine projections 10 on cell A2 may be weakened compared to that of the fine projections 10 on cell A3. At the same time, a magnetic field may be applied again by the coil unit 210 positioned corresponding to cell A1 such that the fine projections 10 on cell A1 may maintain the second shape 10b.

If the application of magnetic fields are sequentially done and ceased to cells A1 and C3 as described above, the fine projections 10 on cells A1 to C3 may be transformed from the first shape 10a to the second shape 10b and then produce the reciprocating motion 10c and 10d while returning from the second shape 10b to the first shape 10a, thereby providing the user of the tactile information supply device 50 with tactile information that is transferred sequentially from cell A1 to cell C3.

As described above, the tactile information supply device according to the present invention may emotionally provide various types of tactile sensations using various types of the tactile sensation providers 1.

Furthermore, according to the present invention, by configuring the tactile unit 100 in the form of the cells 110, not only a simple vibration signal such as an alarm but also complicated information such as texts or geometric figures may be provided as tactile information. In addition, information such as text may be transferred to a location that contacts a user's skin, thereby effectively transferring secret information that is to be protected.

The tactile information supply device 50 according to the present invention may be applied to mobile devices, touch-screen devices, online games, etc. in the information technology (IT) field to provide real-time tactile sensations, applied to driver assistance information feedback systems such as lane departure warning systems, front crash prevention systems, and overspeed protection systems, etc. in the car industry, and also applied to pulsimeters, measurement of the pressure distribution in human teeth, surgical robots, braille books, etc. in the medical field.

While the present invention has been particularly shown and described with reference to embodiments thereof, it will be understood by one of ordinary skill in the art that various changes in form and details may be made therein without departing from the spirit and scope of the invention as defined by the following claims. The embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A tactile information supply device comprising:
   at least one elastomer,
   wherein the elastomer includes magnetic particles or polarizable particles,
   wherein the elastomer is deformed to provide tactile information to a user's skin when an external magnetic field or an electric field is applied to the magnetic particles or the polarizable particles, and
   wherein the tactile information comprises at least one of brushing, tickling, and tapping.

2. The tactile information supply device of claim 1, wherein the elastomer comprises a magnetorheological elastomer (MRE).

3. The tactile information supply device of claim 2, further comprising:
   a magnetic field generator for applying a magnetic field to the elastomer.

4. The tactile information supply device of claim 3, wherein the magnetic field generator includes at least one coil unit that corresponds to the elastomer.

5. The tactile information supply device of claim 2, wherein the elastomer maintains a first shape when not influenced by a magnetic field, and
   wherein the elastomer maintains a second shape when influenced by a magnetic field.

6. The tactile information supply device of claim 5, wherein at least one of a degree, direction, and frequency of the transformation from the first shape to the second shape is controlled by controlling at least one of the intensity, direction, and frequency of the magnetic field generated by the magnetic field generator.

7. The tactile information supply device of claim 5, wherein the elastomer returns from the second shape to the first shape and produces a reciprocating motion by elastic force, thereby transferring the tactile information.

8. The tactile information supply device of claim 1, wherein the elastomer comprises an electrorheological elastomer (ERE).

9. The tactile information supply device of claim 8, further comprising:
an electric field generator for applying an electric field to the elastomer.

10. The tactile information supply device of claim 9, wherein the electric field generator includes at least one electrode unit that corresponds to the elastomer.

11. The tactile information supply device of claim 8, wherein the elastomer maintains a first shape when not influenced by an electric field, and
wherein the elastomer maintains a second shape when influenced by an electric field.

12. The tactile information supply device of claim 11, wherein at least one of a degree, direction, and frequency of the transformation from the first shape to the second shape is controlled by controlling at least one of the intensity, direction, and frequency of the electric field generated by the electric field generator.

13. The tactile information supply device of claim 11, wherein the elastomer returns from the second shape to the first shape and produces a reciprocating motion by elastic force, thereby transferring the tactile information.

14. The tactile information supply device of claim 1, wherein the elastomer provides tactile information by operating to indicate a shape that corresponds to a text or geometric figure.

* * * * *